United States Patent [19]
James et al.

[11] 3,762,509
[45] Oct. 2, 1973

[54] BRAKE SHOE CONSTRUCTION FOR A MOTOR VEHICLE DISC BRAKE

[75] Inventors: Trevor N. James; Francis L. Janosi, both of St. Clair Shores, Mich.

[73] Assignee: Ford Motor Company, Dearborn, Mich.

[22] Filed: July 2, 1971

[21] Appl. No.: 159,380

[52] U.S. Cl. ............................................. 188/73.1
[51] Int. Cl. ........................................... F16d 65/02
[58] Field of Search ....................... 188/73.1, 250 B

[56] References Cited
UNITED STATES PATENTS

| | | | |
|---|---|---|---|
| 3,275,105 | 9/1966 | Petit | 188/250 B |
| 3,134,459 | 5/1964 | Burnett et al. | 188/73.3 X |
| 3,182,753 | 5/1965 | Goncel | 188/73.3 |
| 3,433,328 | 3/1969 | Swift | 188/73.3 X |

FOREIGN PATENTS OR APPLICATIONS

| | | | |
|---|---|---|---|
| 1,575,898 | 1/1970 | Germany | 188/250 B |
| 1,065,267 | 4/1967 | Great Britain | 188/73.3 |

*Primary Examiner*—George E. A. Halvosa
*Attorney*—John R. Faulkner et al.

[57] ABSTRACT

A brake shoe construction for a motor vehicle disc brake. The brake has an anchor plate secured to the wheel support member. The brake caliper is slidably supported on the anchor plate and straddles the brake rotor. The caliper is constructed to urge a pair of brake shoes into engagement with the braking surface of the rotor. One of the brake shoes is slidably supported in guide grooves formed in the anchor by extending end portions with uniplanar V-shaped end surfaces that engage the walls of the grooves. The configuration of the shoe end provides an increase in effective shoe thickness.

6 Claims, 13 Drawing Figures

BRAKE SHOE CONSTRUCTION FOR A MOTOR VEHICLE DISC BRAKE

BACKGROUND OF THE INVENTION

The present invention relates to disc brakes for motor vehicles. The invention is particularly concerned with the type of disc brake in which at least one of the brake shoes is slidably supported by the stationary anchor plate. In such a construction, grooves in the anchor plate guide the brake shoe during its displacement toward the brake rotor upon each brake application.

The anchor plate is stationary and spaced from the rotor by a fixed distance. As the brake lining wears during successive brake applications, the shoe supporting the lining moves closer to the rotor. With a brake of such construction a problem exists in guidng and supporting the brake shoe after the shoe portion adjacent the lining moves into the gap between the anchor and the rotor.

In view of the state of the disc brake art, it is the principal object of the present invention to provide a brake shoe and anchor plate construction in which the shoe may be guided and supported by a stationary anchor plate including such times as when the brake lining has become worn but still has some useful thickness.

BRIEF SUMMARY OF THE DISCLOSURE

In accordance with one embodiment of this invention, a wheel spindle for a motor vehicle front suspension rigidly supports a disc brake anchor or torque plate and rotatably supports a brake rotor. A brake caliper straddles the rotor and is in slidable engagement with the anchor plate. Brake shoes are provided on either side of the rotor which are constructed to be urged by the caliper into frictional engagement with the rotor.

The caliper has a pair of grooves which extend parallel to the rotational axis of the rotor. The anchor plate has a first pair of surfaces that slidably engage the walls of one of the grooves. A releasable retaining means is secured to another portion of the anchor plate and provides a second pair of surfaces that are in slidable engagement with the walls of the other caliper groove. This disc brake construction permits the caliper to slide in a direction parallel to the axis of rotation of the brake rotor during a brake application.

The brake caliper is removable from its connection with the anchor plate by first removing the releasable retaining means. The brake caliper is then free to swing radially outwardly away from its engagement with the anchor.

In the preferred embodiment of the present invention, the outboard brake shoe is secured to the caliper. The inboard brake shoe has extending ends that are slidably received in guide grooves formed in the anchor plate. The grooves guide the inboard brake shoe, and the brake lining secured thereto, toward the rotor during each brake application. The corners of the extending ends of the brake shoe are bent along diagonal lines so that the end surfaces have a generally V shape. The V-shaped ends are uniplanar and provide bearing surfaces that engage the end walls of the guide grooves. During a brake application, brake torque is transmitted from the shoe to the anchor through one of the V-shaped end surfaces.

The V-shaped end surface of the inboard brake shoe provides an increase in the effective thickness of the shoe which serves two principal functions. First, the uniplanar V-shaped end surfaces of the inboard brake shoe increases the stability of the shoe and assists in preventing it from becoming misaligned in the guide grooves. Second, the uniplanar V-shaped end surfaces provide an increase in effective shoe thickness so that when the brake lining is worn and the interface between the lining and shoe is moved into the gap between the anchor and rotor, the shoe will still be guided by the bent corners of the shoe's extending ends.

BRIEF DESCRIPTION OF THE DRAWINGS

The many objects and advantages of a disc brake constructed in accordance with the present invention will become apparent upon consideration of the following detailed description and the accompanying drawings, in which.

DETAILED DESCRIPTION OF THE PREFERRED EMBODIMENT

Figure 1:
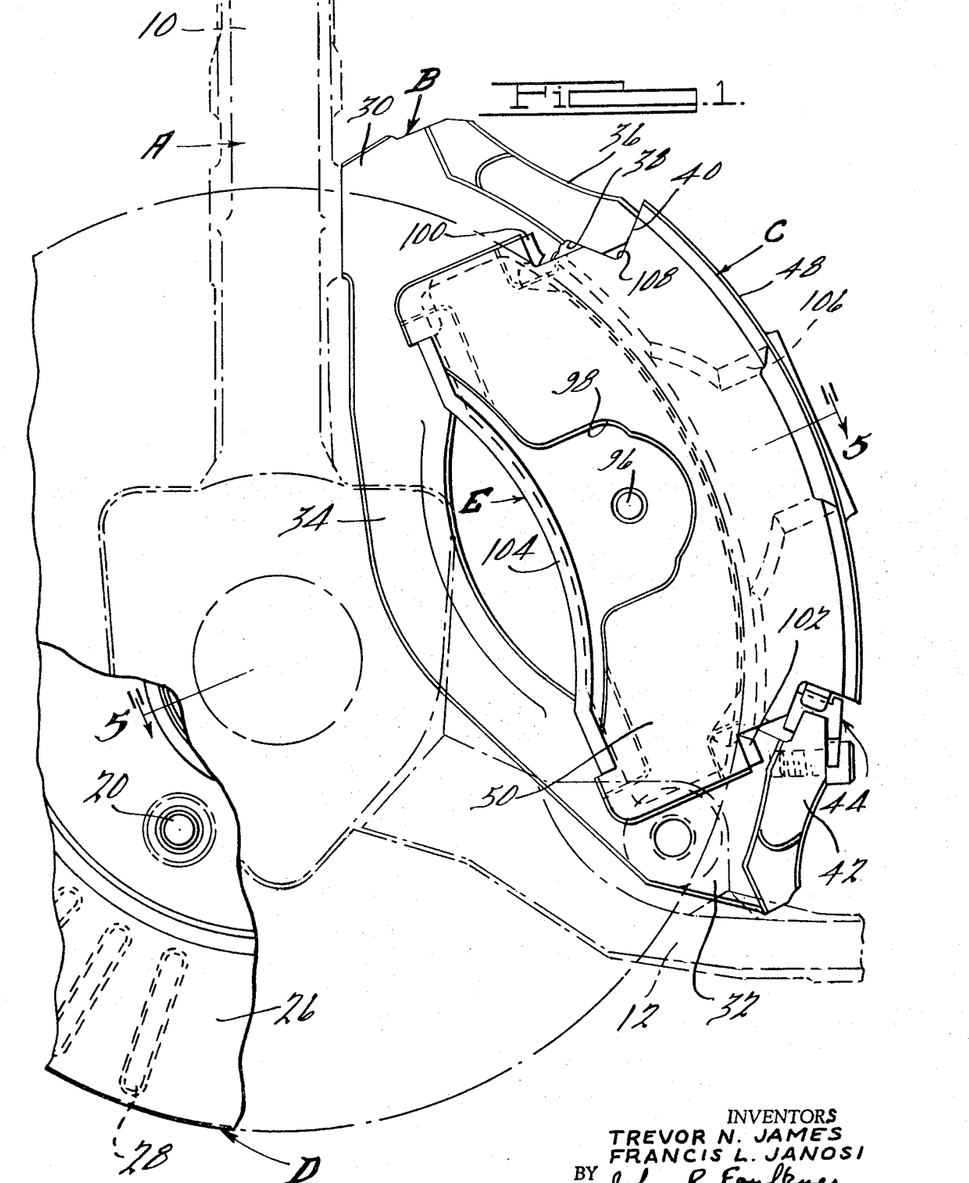
FIG. 1 is a side elevational view of a disc brake assembly embodying a presently preferred form of this invention.

Referring now to the drawings for a detailed description of the presently preferred embodiment of this invention, FIG. 1 illustrates a disc brake assembly for the front wheel of a motor vehicle.

In FIG. 1, the assembly includes a wheel spindle A to which an anchor or torque plate B is rigidly secured. A floating brake caliper C is slidably supported on the anchor B. The caliper C straddles a brake rotor D that is rotatably supported on the spindle A. The brake assembly includes an outboard brake shoe and lining assembly E which is supported on the caliper C and an inboard brake shoe and lining assembly F which is supported on the anchor B. A hydraulic motor within the caliper C is constructed to draw the brake shoe and assemblies E and F together and clamp the brake rotor D therebetween. When the rotor D is clamped, braking torque is transmitted from the outboard shoe and lining assembly E through the caliper C to the anchor B. Braking torque exerted on the inboard shoe and lining assembly F is transmitted directly to the anchor B.

The wheel spindle A forms a part of an independent front suspension system for a motor vehicle and is constructed to be connected to upper and lower suspension arms. The spindle A includes an upwardly extending arm 10 which is designed to receive a ball joint assembly for connection with the upper suspension arm. The lower suspension arm connects to the spindle A at a point not shown in the drawings. The spindle A also includes a rearwardly extending steering arm 12 that is constructed to be connected to the steering linkage of the motor vehicle. The spindle A still further comprises a spindle shaft 16.

Figures 5, 8:
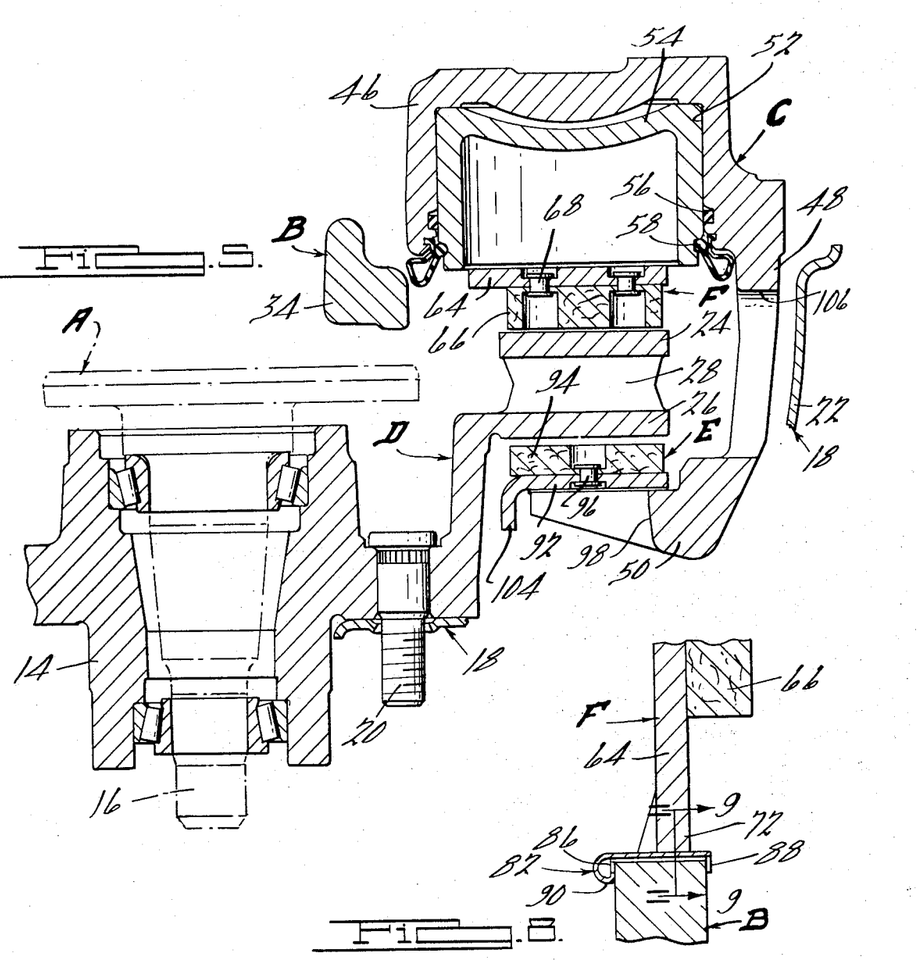
FIG. 5 is a sectional view taken along section line 5—5 of FIG. 1.
FIG. 8 is a sectional view taken along section lines 8—8 of FIG. 4 showing an anti-rattle spring in position between one end of the inboard brake shoe and lining assembly and the anchor plate.

Referring to FIG. 5, the brake rotor D has a generally hat-shaped construction with a hub portion 14 that is rotatably supported on the shaft portion 16 of the spindle A by means of spaced roller bearings. A road wheel 18 is secured to the hub of the rotor D by means of circumferentially spaced bolts 20. The wheel 18 includes a rim portion 22 which is designed to support a pneumatic tire.

The rotor D includes inboard and outboard annular braking surfaces 24 and 26. The members which form the braking surfaces 24, 26 are separated by fins 28. The fins 28 are circumferentially spaced apart so as to provide radial passages between the braking surfaces 24, 26 for the flow of cooling air. Due to the spacing of the braking surfaces 24, 26 and the passages formed by the fins 28, the rotor D is of the type which is sometimes referred to as a ventilated rotor.

The anchor or torque plate B includes a first portion 30 that is bolted to the upright arm 10 and a second portion 32 that is bolted to the steering arm 12 of the spindle A. A bridging member 34 extends between the first and second anchor plate attaching portions 30 and 32. The anchor plate B includes a guide member 36 having a pair of guide surfaces 38 and 40. The guide surfaces 38, 40 are situated radially outwardly beyond the periphery of the rotor D and extend axially across its periphery. The surfaces 38, 40 support a portion of the caliper C. The anchor B also includes a guide support 42 situated adjacent the anchor attaching portion 32. The guide support 42 is situated radially outwardly of the rotor D and extends axially across its periphery. Guide support 42 supports a releasable retaining means 44 that engages the caliper C as will be described in greater detail later.

The brake caliper assembly C straddles the rotor D and is in slidable engagement with the anchor B. Referring to FIG. 5, the caliper C includes a casting having a hydraulic cylinder portion 46, a bridging portion 48 that spans the periphery of the rotor D and a reaction portion 50 situated adjacent the outboard braking surface 26 of rotor D.

The hydraulic cylinder portion 46 of the caliper C includes a cylinder bore 52 in which a piston 54 is slidably received. An annular seal 56 seals the clearance between the cylinder bore 52 and the piston 54. A flexible boot seal 58 is interposed between the cylinder body 46 and the piston 54 to protect the cylinder bore 52 from contamination.

Figure 4:
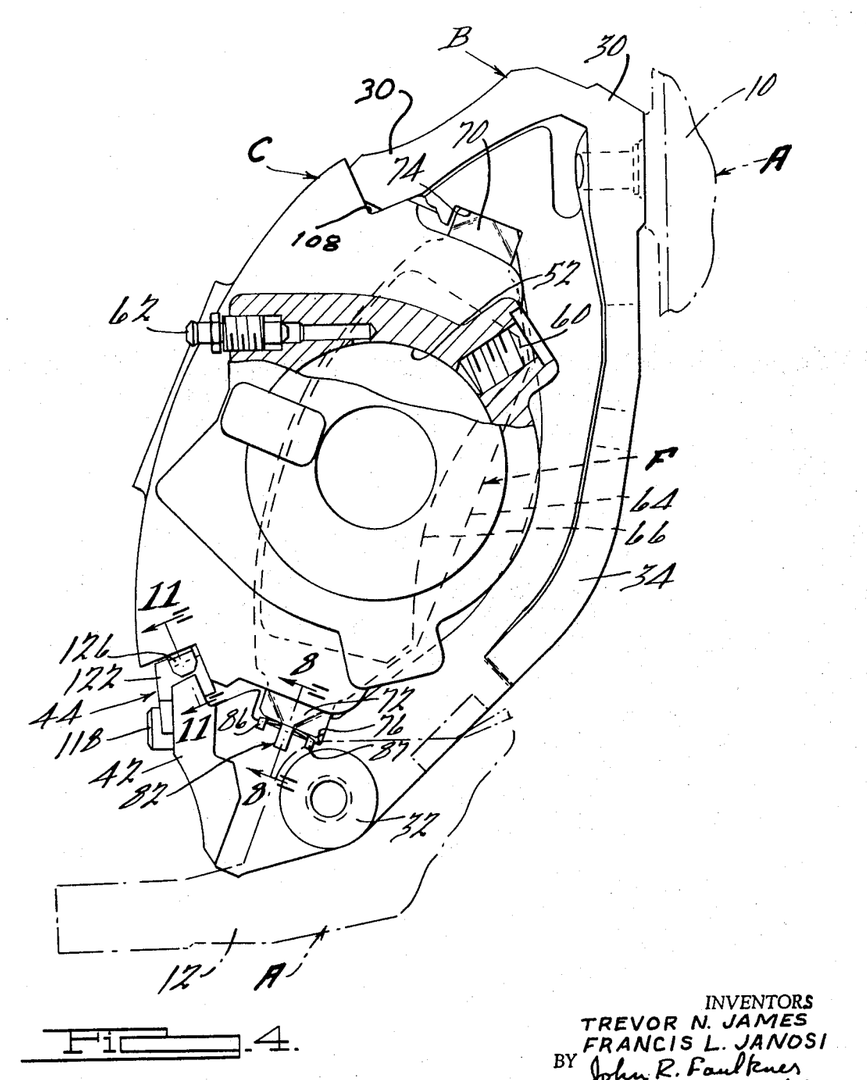
FIG. 4 is a side elevational view, partly in section, of the disc brake assembly viewed from the opposite side of FIG. 1.

As seen in FIG. 4, a port 60 passes through the body of the cylinder portion 46 and connects with the interior of the cylinder bore 52. Port 60 provides a means for connecting a hydraulic pressure source (such as a brake master cylinder) to the chamber situated between the end of the piston 54 and the end of the cylinder bore 52. Fitting 62 provides a means for bleeding air from the hydraulic chamber in a well-known manner for a well-known purpose.

The inboard brake shoe and lining assembly F includes a rigid metal brake shoe 64 to which a frictional brake lining 66 is secured by means of rivets 68. The brake lining 66 is generally smaller than the brake shoe 64. The inboard brake shoe 64 has extending end portions 70 and 72 that fit within generally rectangular guide grooves 74 and 76 provided in the anchor plate B. The rectangular grooves 74, 76 provide guide means for the displacement of the inboard brake shoe and lining assembly F in an axial direction toward the braking surface 24 of rotor D.

The inboard brake shoe and lining assembly F is interposed between the piston 54 and braking surface 24 of the rotor D with the piston arranged to engage the backside of the shoe 64. The lining 66 has a friction face that is constructed to engage the friction surface 24 of the rotor D.

Figures 2, 3, 6, 7:
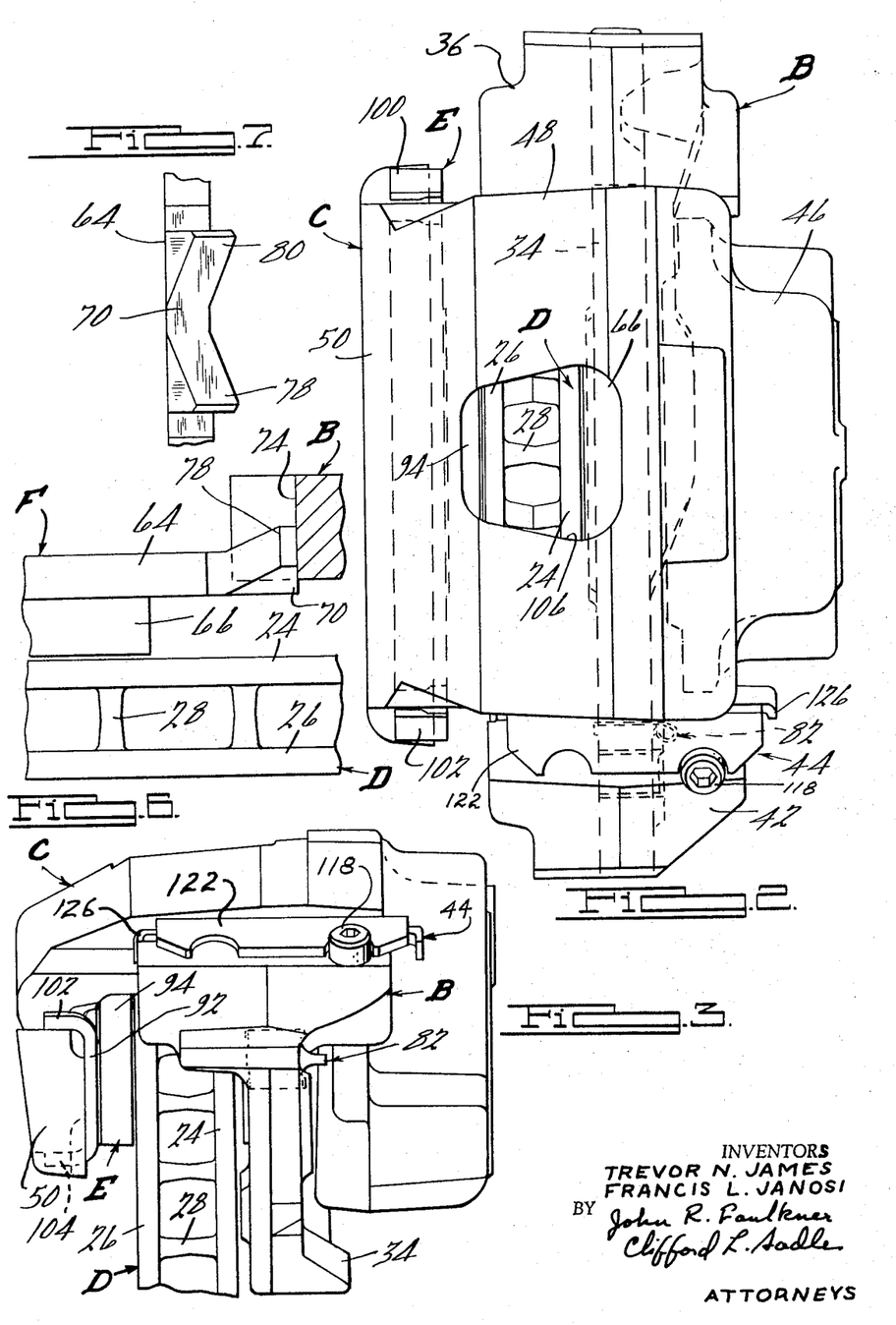
FIG. 2 is a rear elevational view of the disc brake assembly of FIG. 1.
FIG. 3 is an end view of the disc brake assembly.
FIG. 6 is a plan view (slightly enlarged) showing the inboard brake shoe and lining assembly, brake rotor and the anchor plate of the disc brake assembly.
FIG. 7 is an end view (slightly enlarged) of the inboard brake shoe shown in FIG. 6.

As seen in FIGS. 6 and 7, the corners 78 and 80 of the end 70 of the inboard shoe 64 are each bent along a diagonal in a direction away from the lining 66 and away from the braking surface 24 of rotor D. In the end view (FIG. 7), the end surface of the shoe 64 has a V-shaped configuration. The V-shape produced by angling of the corners 78 and 80 provides an increased effective thickness to the bearing surface of the shoe end 70 which engages the depth of the groove 74 of anchor B.

An anti-rattle spring 82 is interposed between the other end 72 of the inboard brake shoe 74 and the depth of the guide groove 76 in the anchor B. The location of the anti-rattle spring 82 is shown in FIG. 4 and its construction is illustrated in greater detail in FIGS. 8, 9 and 10. The anti-rattle spring 82 has an arcuate body portion 84 with a generally rectangular shape in plan view. Tabs 86, 87, 88 and 89 are arranged generally perpendicular to the main body 84 of the spring 82 with one at each corner. The spring 82 is fitted into the groove 76 with the tabs 86, 87 situated on one side of the anchor plate B and the tabs 88, 89 positioned on the other side of the anchor plate B.

A circular spring element 90 is integrally formed of the spring 82 and has a curled over end that engages the anchor plate B adjacent the groove 76. The circular portion 90 exerts a spring force that draws the tabs 88, 89 into tight engagement with the anchor B.

The end 72 of the inboard brake shoe 64 has its corners bent along diagonal lines in the same fashion as the end 70 shown in FIGS. 6 and 7. The end 72 has an end surface of V-shaped configuration similar to that shown in FIG. 7 which bears against the body portion 84 of spring 82.

The arcuate body portion 84 of the anti-rattle spring 82 occupies the clearance space between the torque transmitting end 72 of the inboard brake shoe and lining assembly F and the depth of the groove 76. The spring 82 is constructed to accommodate any variation due to manufacturing tolerances in the dimension between the depths of the grooves 74 and 76 and the length of the inboard brake shoe 64 from end 70 to end 72. The anti-rattle spring 82 maintains a bias force on the brake shoe and lining assembly F and prevents it from chattering or rattling either when the disc brake is being applied or when the brake shoe assembly F is disengaged from the rotor D.

The outboard brake shoe and lining assembly E is secured to the reaction portion 50 of caliper C and comprises a stamped metal shoe 92 to which a brake lining 94 is affixed by means of a series of rivets 96.

The reaction portion 50 of the caliper C is bifurcated by a central recess 98. The outboard brake shoe 92 has edge portions that are turned or bent to form flanges which grip the bifurcated parts of the caliper reaction portion 50. The gripping flanges include bent over tabs 100 and 102 (FIGS. 1, 2 and 3) situated at the corners of the shoes 92. The lower edge of the outboard brake shoe 92 is provided with an extended flange 104. The ends of the flange 104 engage the bifurcated parts of the reaction portion 50 whereby the parts are trapped between the ends of flange 104 and the tabs 100 and 102. This flange arrangement secures the outboard brake shoe and lining assembly E to the caliper C.

The bridging portion 48 of the caliper C which spans the periphery of the rotor D and interconnects the cylinder portion 46 and reaction portions 50 is provided with a central opening 106. The opening 106 serves as a means for permitting the visual inspection of the linings 66 and 94 of the inboard and outboard brake shoe and lining assemblies F and E.

Means are provided in accordance with the present invention for slidably supporting and releasably securing the caliper C to the anchor plate B. One edge of the bridging portion 48 of caliper C is provided with a V-shaped axially extending groove 108. The angled surfaces which form the V-shaped groove 108 complement the inclined surfaces 38 and 40 of the guide member 36 of anchor plate B. In operation, the inclined surfaces of the V-shaped caliper groove 108 are in slidable engagement with inclined surfaces 38 and 40.

Similarly, angled surfaces 110 and 112 define a V-shaped groove at the opposite edge of the bridging portion of caliper C. The releasable retaining means 44 is interposed between the guide support 42 and the V-shaped groove formed by the angle surfaces 110, 112. The releasable retaining means 44 provides slidable supports for the caliper C and, in addition, a means for removing the caliper from engagement with the anchor B.

The releasable retaining means 44 includes a key 114 having a generally channel-shaped construction that extends axially across the periphery of the rotor D and is supported by the guide support 42 of the anchor plate B. The key 114 includes an outer flange 116 which rests against the exterior surface of the guide support 42 and is provided with at least one notch on the edge of the flange 116. A machine screw 118 is secured in a threaded hole in the guide support 42 and engages one of the notches in the key flange 116. This interrelationship prevents the axial displacement of the key.

The key 114 includes a second flange 120 positioned adjacent the lower surface of the guide support 42. The lower flange 120, in addition to being positioned adjacent the guide support 42, has its exterior surface in slidable engagement with the surface 112 of the caliper groove. The central portion 122 of the key 114 is formed with an axially extending groove 124 in which a leaf spring 126 is positioned. The spring 126 has a central bowed portion that engages the surface 110 of the caliper groove and flat axially extending end portions which engage the groove 120 of the key 114. The ends 128 of the spring 126 are bent at an angle to form locating tabs.

Figure 11:
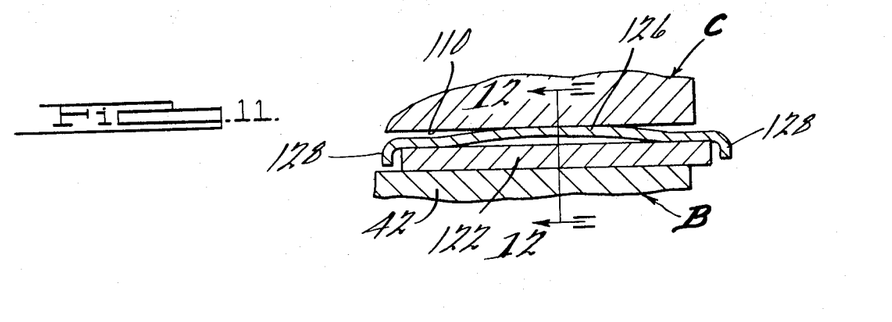
FIG. 11 is a sectional view taken along section lines 11—11 in FIG. 4 and showing the retaining key and leaf spring.

The channel-shaped key 122 is located with respect to the guide support 42 by the machine screw 118. The leaf spring 126 is secured and located in position by the bent ends 128 which prevents its axial displacement. As indicated in FIG. 11, the leaf spring 126 is of sufficient length so as to span the key 122 with its bent ends 128 positioned adjacent the ends of the key 122. The leaf spring 126 is constructed to exert a spring force tending to move the caliper C in a direction away from guide support 42 and into engagement with the inclined surfaces 38, 40 of the guide member 36 of anchor B.

OPERATIONS

The disc brake assembly is shown in the drawings in association with the left front wheel of an automobile. The brake rotor D rotates in a counterclockwise direction as seen in FIG. 1 during forward movement of the vehicle. During a brake application, pressure fluid is admitted through the port 60 into the chamber between the piston 54 and the depth of the bore 52. Pressure fluid in this chamber causes the piston 54 to move toward the brake rotor D (see FIG. 5). This action forces the inboard brake shoe and lining assembly F to move into engagement with the annular friction surface 24 of the rotor D. The inboard brake shoe and lining assembly F is guided in its movement toward the rotor D by its ends 72 and 74 which slide in the anchor plate grooves 70 and 72.

The bridge portion 48 of caliper C is in slidable engagement with the guide member 36 of anchor B and the releasable retaining means 44 connected to guide support 42. When the pressure chamber of cylinder 52 is pressurized with hydraulic fluid, the piston 54 and inboard brake shoe and lining assembly F move toward the rotor 20. The body of caliper C is drawn in the opposite direction by the pressurization of the chamber. This causes the reaction portion 50 to draw the outboard brake shoe and lining assembly F into engagement with the annular friction face 26 of rotor D. Thus, when the chamber of cylinder bore 52 is pressurized with hydraulic fluid, the caliper C is activated to cause the inboard and outboard brake shoe and lining assemblies F and E to trap the rotor D.

When the linings 66 and 94 engage the rotor D, they will tend to shift laterally in the direction of rotor rotation. Rotation of the inboard brake shoe and lining assembly F will be resisted and prevented by the engagement of the leading end 70 of the shoe 64 with the depth of the groove 74 in anchor B. The outboard brake shoe and lining assembly F is secured to the caliper casting C so that when it is drawn into engagement with the rotor D, braking torque will be transmitted through the caliper C to the guide member 36.

Figure 9:
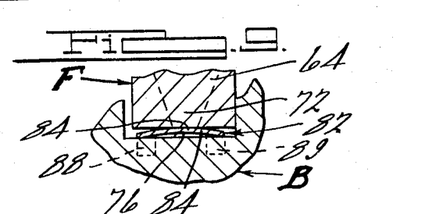
FIG. 9 is a sectional view taken along section lines 9—9 of FIG. 8.
Figure 10:
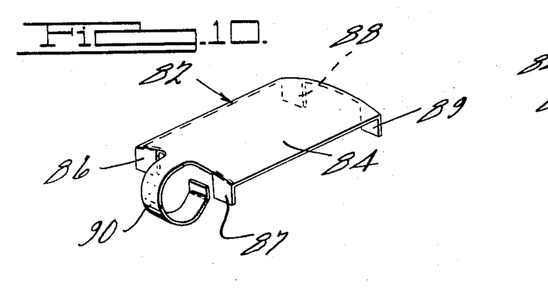
FIG. 10 is a perspective view of the anti-rattle spring of FIGS. 8 and 9.

When the vehicle having the disc brake of FIG. 1 is moving in reverse, the rotor D will be turning in a clockwise direction. A brake application under these circumstances will cause the inboard brake shoe lining assembly F to transmit braking torque through the normally trailing end 72 through the anti-rattle spring 82 to the anchor plate groove 76 (FIGS. 8 and 9). Braking torque for the outboard shoe and lining assembly E will be transmitted through the caliper C and the releasable retaining means 44 to the guide support 42.

It will be noted from FIGS. 6 and 7 that the corners 78 and 80 of the leading end 70 of inboard brake shoe 64 are angularly bent whereby the effective thickness of the shoe 64 is increased. This unique construction acts to stabilize the support for the brake shoe 64. In addition, it increases the effective thickness of the brake shoe so that when the lining 66 becomes worn, the corner portions of the end face of the leading end 70 will remain in engagement with the depth of the groove 74 (see FIG. 6). The trailing end 72 (see FIGS. 8 and 9) is similarly constructed with bent corners which provide a V-shaped end face in engagement with the anti-rattle spring 82.

Figures 12, 13:
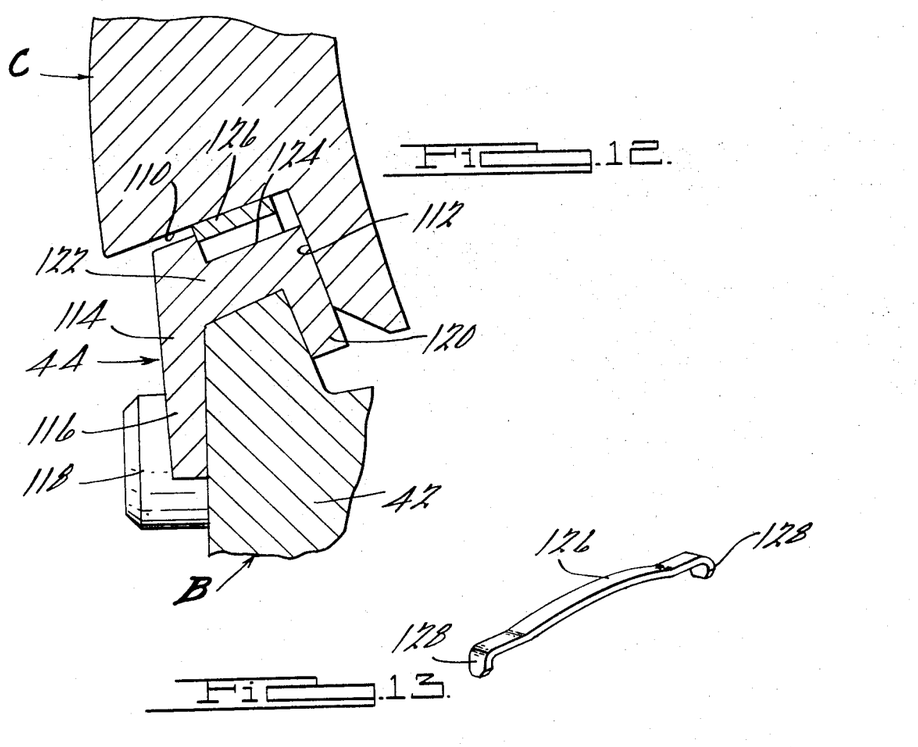
FIG. 12 is a sectional view taken along section lines 12—12 of FIG. 11.
FIG. 13 is a perspective view of the leaf spring of FIGS. 11 and 12.

The condition of the linings 66 and 94 can be determine by visual observation through the hole 106 in the bridge portion 48 of caliper C. If it is determined that the linings are worn and need to be replaced, the caliper C may be removed from engagement with the anchor B by removal of the releasable retaining means 44. This is done by withdrawing the threaded machine screw 18 which permits the key 122 and leaf spring 126 to be displaced in an axial direction until these two elements are removed from engagement with the caliper C and anchor B. A gap then exists between the guide support 42 and the inclined surfaces 110, 112. To remove the caliper C, it is merely necessary to swing it in pivotal fashion about the contact between the groove 108 and the inclined surfaces 38 and 40. The channel-shaped key 114 is designed to have a base portion 122 of sufficient thickness so that when it is removed, a big enough gap will be provided to permit the edge of surface 112 (FIG. 12) to clear the end of the guide support 42 as it is swung radially outwardly.

Once the caliper C is removed from engagement with the anchor B, the outboard brake shoe and lining assembly F may be forcibly removed from the reaction portion 50 of the caliper C for replacement purposes. With the caliper C out of the way, the inboard brake shoe and lining assembly F may be removed in an axial direction from its connection with the grooves 74, 76 of anchor B for replacement purposes.

In accordance with a slightly alternate procedure for disassembling the brake, the key 114 and leaf spring 126 are first removed. The caliper C is then shifted circumferentially to close the gap left by the removed key 114 and spring 126 whereby the caliper guide support 42 is placed in nested engagement with the Vpshaped groove formed by inclined surfaces 110 and 112. The caliper C is then free to pivot about its engagement with guide support 42 in an outward direction. The edges of the groove 108 will clear the guide member 36 of anchor B.

It is to be noted that the minimum distance between the guide member 36 and guide support 42 is less than the maximum width of the bridging portion 48 of caliper C so that the guide member 36 must be nested in the groove 108 or the guide suppport 42 nested in the groove of surfaces 110, 112 in order to permit the radial removal of the caliper C after the key 114 and spring 126 are removed.

SUMMARY

In accordance with the presently preferred embodiment of this invention, a unique disc brake assembly is provided having an inboard brake shoe with a V-shaped uniplanar end face that is slidably received in guide grooves formed in the stationary anchor. The V-shaped end faces increase the effective thickness of the shoe engaging the end wall of the guide grooves. The construction increases the stability of the shoe and prevents misalignment in the guide grooves upon each brake application. In addition, the increased effective thickness of the brake shoe permits the shoe to move closer to the rotor during subsequent brake applications after the brake lining has been worn but some useful lining thickness still remains. The shoe end construction increases the total permissible displacement of the inboard brake shoe while still being guided by the guide grooves.

The foregoing description presents the presently preferred embodiment of this invention. Modifications and alterations may occur to those skilled in the art which will come within the scope and spirit of the following claims.

We claim:

1. A disc brake for a motor vehicle having a stationary anchor member,
   a rotatable rotor,
   a housing member straddling said rotor and connected to said anchor member,
   a first brake shoe and lining assembly disposed on one side of said rotor,
   a second brake shoe and lining assembly disposed on the other side of said rotor,
   said housing member having means constructed to move said assemblies into engagement with said rotor,
   said first assembly comprising a metallic brake shoe and a friction brake lining secured to said brake shoe,
   the interface between said brake shoe and said brake lining being substantially uniplanar,
   said brake shoe having end portions extending beyond said brake lining,
   said end portions having a pair of outwardly facing load transferring end surfaces,
   one of said members having a pair of inwardly facing guide surfaces,
   said guide surfaces slidably supporting said end surfaces of said brake shoe and constructed to guide said first assembly for axial displacement relative to said rotor during a brake application,
   said end surfaces each having a uniform width measured in a direction parallel to the axis of said rotor that is equal to the thickness of said brake shoe,
   said end portions having only their corners bent to define said end surface,
   said end surfaces each having an irregular shape constructed to provide an effective thickness to said brake shoe that is greater than its actual thickness.

2. A disc brake for a motor vehicle according to claim 1 and including:
   said end surfaces each being uniplanar and of a generally V-shape configuration.

3. A disc brake for a motor vehicle according to claim 1 and including:
   said end surfaces each having one edge disposed closer to said rotor than its other edges,
   said one edge having a portion disposed generally in the plane of said interface and a portion disposed out of the plane of said interface in a direction away from said rotor,
   said end surfaces each being uniplanar.

4. A disc brake for a motor vehicle having a stationary anchor member,
a rotatable rotor,
a housing member straddling said rotor and connected to said anchor member,
a first brake shoe and lining assembly disposed on one side of said rotor,
a second brake shoe and lining assembly disposed on the other side of said rotor,
said housing member having means constructed to move said assemblies into engagement with said rotor,
said first assembly comprising a metallic brake shoe and a friction brake lining secured to said brake shoe,
the interface between said brake shoe and said brake lining being substantially uniplanar,
said brake shoe having end portions extending beyond said lining,
said end portions having a pair of outwardly facing load transferring end surfaces,
one of said members having a pair of inwardly opening guide grooves,
said guide grooves slidably supporting said end portions of said first assembly for axial displacement relative to said rotor during a brake application,
said guide grooves having a pair of parallel inwardly facing load receiving surfaces,
one of said end surfaces slidably engaging one of said load receiving surfaces,
said one end surface having a uniform width measured in a direction parallel to the axis of said rotor that is equal to the thickness of said brake shoe,
said end portion defining said one end surface having only its corners bent to define said one end surface,
said one end surface having an irregular shape constructed to provide an effective thickness to said brake shoe that is greater than its actual thickness.

5. A disc brake for a motor vehicle according to claim 4 and including:
said one end surface being uniplanar and of a generally V-shape configuration.

6. A disc brake for a motor vehicle according to claim 4 and including:
said one end surface having one edge disposed closer to said rotor than its other edges,
said one edge having a portion disposed generally in the plane of said interface and a portion disposed out of the plane of said interface in a direction away from said rotor,
said pair of end surfaces each being uniplanar.

* * * * *

UNITED STATES PATENT OFFICE
CERTIFICATE OF CORRECTION

Patent No. 3,762,509   Dated October 2, 1973

Inventor(s) Trevor N. James and Francis L. Janosi

It is certified that error appears in the above-identified patent and that said Letters Patent are hereby corrected as shown below:

Column 6, line 31, change "72 and 74" to -- 70 and 72 --.

Column 6, line 32, change "70 and 72" to -- 74 and 76 --.

Signed and sealed this 1st day of October 1974.

(SEAL)
Attest:

McCOY M. GIBSON JR.
Attesting Officer

C. MARSHALL DANN
Commissioner of Patents